(No Model.)
W. BISHMAN.
CURTAIN FIXTURE.
No. 455,982. Patented July 14, 1891.
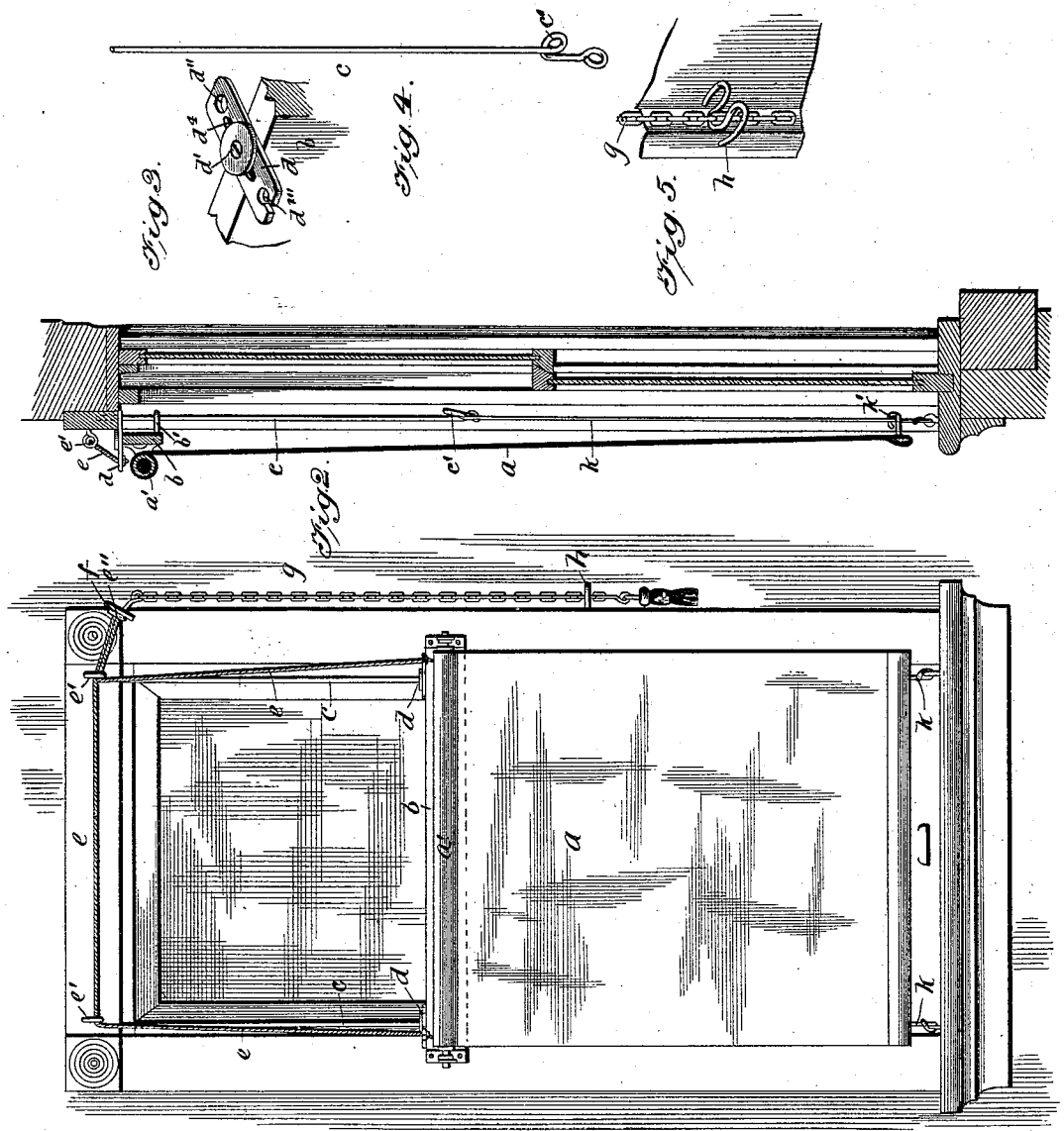
Witnesses
Inventor
William Bishman
By his Attorney
THE NORRIS PETERS CO., PHOTO-LITHO., WASHINGTON, D. C.

United States Patent Office.

WILLIAM BISHMAN, OF WASHINGTON, PENNSYLVANIA.

CURTAIN-FIXTURE.

SPECIFICATION forming part of Letters Patent No. 455,982, dated July 14, 1891.

Application filed December 11, 1890. Serial No. 374,353. (No model.)

*To all whom it may concern:*

Be it known that I, WILLIAM BISHMAN, a citizen of the United States, residing at Washington, in the county of Washington and State of Pennsylvania, have invented certain new and useful Improvements in Curtain-Fixtures, of which the following is a specification, reference being had therein to the accompanying drawings.

Figure 1 represents an elevation of a window provided with my improvements; Fig. 2, a vertical longitudinal sectional view thereof; Fig. 3, a detail perspective view of an adjustable plate secured on the roller-carrying bar; Fig. 4, a detail perspective view of one of the rods upon which the shade-roller travels up and down, and Fig. 5 a detail perspective view of a fastening for the chain.

My invention has relation to that class of window-shades wherein the shade-rollers are mounted upon a vertically-movable bar adapted to be adjusted and held at various positions along the length of the window-frame for the purpose of ventilation or for other purposes; and it consists in certain novel features of construction that will fully hereinafter appear, and be particularly pointed out in the claims appended.

In the drawings, $a$ designates a shade connected to and wound upon a suitable spring-actuated roller $a'$, which is journaled in the usual brackets mounted upon a transverse bar $b$, supported in front of and in close proximity to, but not in contact with, the window-frame. Pivoted upon the upper edge of this bar $b$, near each of its ends, is a plate or bar $d$, these plates being rendered adjustable in and out by means of slots $d^4$, formed in them, through which slots the pivotal screws $d'$ pass into the bar, as shown particularly in Fig. 3. The inner ends of these plates $d$ are provided with holes $d''$, through which the guide-rods $c$ pass, and their outer ends are slotted for the attachment of the adjustment-cords $e$, which latter pass up to the top of the window and are there passed through hooks or eyes $e'$, secured thereto and then carried to one side and passed through another hook or eye $e''$. The ends of the cords are connected together and passed loosely through the upper link of a depending chain $g$, whereby the curtain-bar may be readily adjusted to a horizontal position should it become inclined or crooked. By means of the cords and chain, which latter is provided with a depending tassel at its lower end, the roller-carrying bar may be readily adjusted up and down upon the guide-rods $c\ c$, a stop $f$ being placed at a suitable point on the chain and adapted to abut against the hook $e''$ and limit the fall of the shade-roller, as shown in Fig. 1.

To hold the shade-roller at any particular point, a catch $h$ is secured to the frame in such a manner as to be out of the way and at the same time engage the links of the depending chain. This chain holder or catch is formed, preferably, of a wire bent into the form of a staple and driven into the window-frame, the staple having an open loop formed in it to removably engage any one of the chain-links, as shown clearly in Fig. 5.

The upper ends of the guide-rods $c\ c$ are inserted in recesses formed in the frame, and their lower ends are each bent into the form of an eye $c'$ and secured, respectively, to the inner sides of the window-frame, as shown, whereby they may be readily attached to any window of ordinary construction. The eyes $c'$, formed at the lower ends of the rods, serve as abutments to limit the downward movement of the shade-carrying bar, eyes $b'$ being secured to the rear side of this bar and adapted to embrace the guide-rods, and thereby assist in guiding the said bar. These eyes $b'$ may or may not be used, as occasion may require; but when they are employed they are made sufficiently large to permit of a limited adjustment of the roller-carrying bar.

Stretched from each of the eyes $c'$ on the lower ends of the guide-rods to the window-sill is a vertical wire or cord $k$, and engaging and traveling upon these wires or cords are two hooks $k'$, screwed into the lower cross-bar of the shade, as shown in Fig. 2. These hooks travel upon the wires between the sill and the stop-eyes $c'$, the shade being thereby prevented from being drawn up out of reach by the spring-actuated roller, and also being prevented from flapping about when the lower sash is raised. If desired, the shade may be readily detached from the wires by disengaging the hooks $k'$ therefrom.

This invention posesses several essential advantages. One advantage of this construction is that none of the working parts project beyond the shade-roller, but are practically out of the way, so as not to interfere with any drapery that it may be desired to ornament the window with, and, furthermore, the devices are extremely simple and inexpensive and are readily adaptable to any-sized window. The pivoted and adjustable plates $d\ d$, carried by the roller-bar, enable the latter to be not only adjusted laterally or endwise, but also enable this bar to be adjusted so as not to scratch or deface the face of the window-frame by contact therewith. The chain-holding device $h$ is also a good feature, as it enables me to avoid the use of all counterbalancing-weights, pivoted and spring clamps, &c., to secure and hold the roller at the various points desired.

Having thus fully described my invention, what I claim is—

1. The combination of a window, the two guide-rods $c\ c$, removably secured to the upper part thereof, one rod being arranged at each side of the window and within the frame thereof, so as to be out of the way, a vertically-movable bar $b$, arranged across and in close proximity to the face of the window-frame, this bar carrying a spring-actuated shade and roller, plates $d$, pivotally and adjustably secured to the said bar $b$ and extended back so as to engage and slide upon the said guide-rods, these plates serving to enable the roller-carrying bar to be adjusted both endwise and inwardly and outwardly with respect to the face of the window-frame, and cords for vertically adjusting the roller-carrying bar, substantially as and for the purposes described.

2. The combination of a window, the two guide-rods $c\ c$, removably secured to the upper part thereof, the rods being respectively arranged at the sides of the window and within the frame thereof, so as to be out of the way, the upper ends of the rods being removably inserted in apertures in the tops of the window-frame and their respective lower ends being formed into eyes $c'$ (which form abutments for the vertically-movable shade-carrying bar) and secured to the respective sides of the window-frame, cords or wires $k$, stretched from the eyes $c'$ to the window-sill, a transverse roller-carrying bar carrying a spring-actuated shade-roller and provided with plates connecting it to the said guide-rods $c\ c$, hooks connecting the lower end of the shade to the cords or wires $k$, and means for vertically adjusting the said transverse bar, substantially as described.

In testimony whereof I affix my signature in presence of two witnesses.

WM. BISHMAN.

Witnesses:
C. D. DAVIS,
H. J. ENNIS.